United States Patent
Hasegawa et al.

(10) Patent No.: US 9,693,069 B2
(45) Date of Patent: Jun. 27, 2017

(54) IMAGE CODING APPARATUS (71) Applicant: MegaChips Corporation, Osaka-shi (JP)

(72) Inventors: Hiromu Hasegawa, Osaka (JP); Toshimitsu Tatsuka, Osaka (JP); Takeaki Komuro, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/936,075

(22) Filed: Nov. 9, 2015

(65) Prior Publication Data

US 2016/0065971 A1   Mar. 3, 2016

Related U.S. Application Data (62) Division of application No. 13/575,373, filed as application No. PCT/JP2011/050737 on Jan. 18, 2011, now abandoned.

(30) Foreign Application Priority Data

Jan. 28, 2010   (JP) ................................ 2010-016241

(51) Int. Cl.
*H04N 19/176*   (2014.01)
*H04N 19/172*   (2014.01)
(Continued)

(52) U.S. Cl.
CPC ......... *H04N 19/176* (2014.11); *H04N 19/107* (2014.11); *H04N 19/172* (2014.11); *H04N 19/61* (2014.11)

(58) Field of Classification Search
CPC .... H04N 19/172; H04N 19/61; H04N 19/107; H04N 19/176
(Continued)

(56) References Cited

U.S. PATENT DOCUMENTS

| 5,491,509 A | 2/1996 | Jeong et al. |
| 7,020,203 B1 | 3/2006 | Horowitz et al. |
| 2006/0056519 A1 | 3/2006 | Horowitz et al. |

FOREIGN PATENT DOCUMENTS

| JP | 3 250886 | 11/1991 |
| JP | 5 244582 | 9/1993 |

(Continued)

OTHER PUBLICATIONS

"3.2 MPEG-2 video—MPEG-2," Pioneer, Chapter 3, Total 6 Pages, (Dec. 10, 2009) (with English translation).

(Continued)

*Primary Examiner* — Gims Philippe
*Assistant Examiner* — On S Mung
(74) *Attorney, Agent, or Firm* — Oblon, McClelland, Maier & Neustadt, L.L.P.

(57) ABSTRACT

It is an object of the present invention to provide an image coding technique for suppressing degradation in image quality, in which the time and space where intra macroblocks appear are dispersed. A block count determination part determines the number of intra macroblocks to be allocated in each frame. A position determination part arranges the intra macroblocks at random positions in each frame. A coding part performs coding on the basis of the number of intra macroblocks to be allocated in a time direction, which is determined by the block count determination part, and the arrangement of the intra macroblocks in a spatial direction, which is determined by the position determination part, to thereby output compressed image data.

4 Claims, 7 Drawing Sheets

(51) Int. Cl.
*H04N 19/61* (2014.01)
*H04N 19/107* (2014.01)

(58) Field of Classification Search
USPC ............ 375/240.13, 240.24, 240.25, 240.26
See application file for complete search history.

(56) References Cited

FOREIGN PATENT DOCUMENTS

| | | |
|---|---|---|
| JP | 6 98295 | 4/1994 |
| JP | 7 59085 | 3/1995 |
| JP | 2001 501396 | 1/2001 |
| JP | 2002-176652 | 6/2002 |
| JP | 2002-369208 A | 12/2002 |
| JP | 2004 215252 | 7/2004 |
| JP | 2007 221411 | 8/2007 |
| JP | 2008-258952 A | 10/2008 |

OTHER PUBLICATIONS

"7-1 compression coding," Reference Room, Japanese Patent Office, Total 16 Pages, (Dec. 10, 2009) (wiith English translation).
International Search Report Issued Apr. 5, 2011 in PCT/JP11/50737 Filed Jan. 18, 2011.

| M0 | M1 | M2 | M3 | M4 | M5 |
|----|----|----|----|----|----|
| M6 | M7 | M8 | M9 | M10 | M11 |
| M12 | M13 | M14 | M15 | M16 | M17 |
| M18 | M19 | M20 | M21 | M22 | M23 |

FIG. 3

CASE1

| FRAME No. | F0 | F1 | F2 | F3 | F4 | F5 | F6 | F7 | F8 | F9 |
|---|---|---|---|---|---|---|---|---|---|---|
| THE NUMBER OF ALLOCATED INTRA MACROBLOCKS | 2 | 2 | 2 | 2 | 2 | 2 | ③ | ③ | ③ | ③ |

CASE2

| FRAME No. | F0 | F1 | F2 | F3 | F4 | F5 | F6 | F7 | F8 | F9 |
|---|---|---|---|---|---|---|---|---|---|---|
| THE NUMBER OF ALLOCATED INTRA MACROBLOCKS | ③ | ③ | ③ | ③ | 2 | 2 | 2 | 2 | 2 | 2 |

CASE3

| FRAME No. | F0 | F1 | F2 | F3 | F4 | F5 | F6 | F7 | F8 | F9 |
|---|---|---|---|---|---|---|---|---|---|---|
| THE NUMBER OF ALLOCATED INTRA MACROBLOCKS | ③ | 2 | ③ | 2 | ③ | 2 | 2 | ③ | 2 | 2 |

↑ B   ↑ B   ↑ A   ↑ A

CASE4

| FRAME No. | F0 | F1 | F2 | F3 | F4 | F5 | F6 | F7 | F8 | F9 |
|---|---|---|---|---|---|---|---|---|---|---|
| THE NUMBER OF ALLOCATED INTRA MACROBLOCKS | ③ | 2 | 2 | ③ | 2 | 2 | ③ | 2 | 2 | ③ |

CASE5

| FRAME No. | F0 | F1 | F2 | F3 | F4 | F5 | F6 | F7 | F8 | F9 |
|---|---|---|---|---|---|---|---|---|---|---|
| THE NUMBER OF ALLOCATED INTRA MACROBLOCKS | ③ | 2 | 2 | ③ | 2 | ③ | 2 | 2 | ③ | 2 |

↑ A   ↑ B   ↑ A   ↑ B

CASE6

| FRAME No. | F0 | F1 | F2 | F3 | F4 | F5 | F6 | F7 | F8 | F9 |
|---|---|---|---|---|---|---|---|---|---|---|
| THE NUMBER OF ALLOCATED INTRA MACROBLOCKS | ③ | 2 | ③ | 2 | 2 | ③ | 2 | ③ | 2 | 2 |

| FRAME No. | INTRA MACROBLOCK No. |
|---|---|
| F0 | M13, M7, M20 |
| F1 | M4, M14 |
| F2 | M0, M21, M9 |
| F3 | M19, M1 |
| F4 | M5, M3 |
| F5 | M22, M6, M18 |
| F6 | M10, M17 |
| F7 | M11, M16, M8 |
| F8 | M12, M23 |
| F9 | M2, M15 |

FIG. 6

FRAME F0
| M0 | M1 | M2 | M3 | M4 | M5 |
|----|----|----|----|----|----|
| M6 | M7 | M8 | M9 | M10| M11|
| M12| M13| M14| M15| M16| M17|
| M18| M19| M20| M21| M22| M23|

FRAME F1
| M0 | M1 | M2 | M3 | M4 | M5 |
|----|----|----|----|----|----|
| M6 | M7 | M8 | M9 | M10| M11|
| M12| M13| M14| M15| M16| M17|
| M18| M19| M20| M21| M22| M23|

FRAME F2
| M0 | M1 | M2 | M3 | M4 | M5 |
|----|----|----|----|----|----|
| M6 | M7 | M8 | M9 | M10| M11|
| M12| M13| M14| M15| M16| M17|
| M18| M19| M20| M21| M22| M23|

FRAME F3
| M0 | M1 | M2 | M3 | M4 | M5 |
|----|----|----|----|----|----|
| M6 | M7 | M8 | M9 | M10| M11|
| M12| M13| M14| M15| M16| M17|
| M18| M19| M20| M21| M22| M23|

FRAME F4
| M0 | M1 | M2 | M3 | M4 | M5 |
|----|----|----|----|----|----|
| M6 | M7 | M8 | M9 | M10| M11|
| M12| M13| M14| M15| M16| M17|
| M18| M19| M20| M21| M22| M23|

FRAME F5
| M0 | M1 | M2 | M3 | M4 | M5 |
|----|----|----|----|----|----|
| M6 | M7 | M8 | M9 | M10| M11|
| M12| M13| M14| M15| M16| M17|
| M18| M19| M20| M21| M22| M23|

FRAME F6
| M0 | M1 | M2 | M3 | M4 | M5 |
|----|----|----|----|----|----|
| M6 | M7 | M8 | M9 | M10| M11|
| M12| M13| M14| M15| M16| M17|
| M18| M19| M20| M21| M22| M23|

FRAME F7
| M0 | M1 | M2 | M3 | M4 | M5 |
|----|----|----|----|----|----|
| M6 | M7 | M8 | M9 | M10| M11|
| M12| M13| M14| M15| M16| M17|
| M18| M19| M20| M21| M22| M23|

FRAME F8
| M0 | M1 | M2 | M3 | M4 | M5 |
|----|----|----|----|----|----|
| M6 | M7 | M8 | M9 | M10| M11|
| M12| M13| M14| M15| M16| M17|
| M18| M19| M20| M21| M22| M23|

FRAME F9
| M0 | M1 | M2 | M3 | M4 | M5 |
|----|----|----|----|----|----|
| M6 | M7 | M8 | M9 | M10| M11|
| M12| M13| M14| M15| M16| M17|
| M18| M19| M20| M21| M22| M23|

FIG. 7

| F2 | F3 | F9 | F4 | F1 | F4 |
|----|----|----|----|----|----|
| F5 | F0 | F7 | F2 | F6 | F7 |
| F8 | F0 | F1 | F9 | F7 | F6 |
| F5 | F3 | F0 | F2 | F5 | F8 |

FIG. 8

FRAME No. → F0 F1 F2 F3 F4 F5 F6 F7 F8 F9 F10 F11 F12 F13 F14

IMAGE CODING APPARATUS

CROSS REFERENCE TO RELATED APPLICATION

The present application is a divisional of U.S. application Ser. No. 13/575,373, filed on Jul. 26, 2012, which was the National Stage of International Application No. PCT/JP2011/050737, filed on Jan. 18, 2011, which claimed priority to Japanese Application No. 2010-0160241, filed on Jan. 28, 2010. The entire contents of both of which are hereby incorporated by reference in its entirety.

TECHNICAL FIELD

The present invention relates to an apparatus for coding images to generate compressed images, and more particularly to an apparatus which uses an intra coding process and an inter coding process to code images.

BACKGROUND ART

In image coding techniques such as MPEG2, H. 264, and the like, an intra coding process and an inter coding process are used. In the intra coding process, coding is completed within a frame to be coded, without using any reference frames. In the inter coding process, coding for a frame to be coded is performed by using one or more reference frames.

All macroblocks included in an I picture are coded by the intra coding process. Macroblocks included in a P picture and a B picture are coded by the inter coding process. Since all the macroblocks in the I picture are intra-coded, the amount of generated codes in the I picture is larger than that in the P picture or the B picture. Even in the H.264 where an intra prediction technique is used, the amount of generated codes in the I picture is still larger than that in the P picture or the B picture.

In a system in which low-delay reproduction or transmission is required, an increase in the amount of generated codes in the I picture becomes a problem. Further, there is another problem that the amount of generated codes oscillates in a cycle of appearance of the I picture. When the amount of generated codes oscillates, a larger buffer size is temporarily needed, which is inefficient.

PRIOR-ART DOCUMENTS

[Patent Document 1] Japanese Patent Application Laid Open Gazette No. 2004-215252
[Non-Patent Document 1] Technical Guide for MPEG technologies in the homepage of Pioneer Corporation, www.pioneer.jp.
[Non-Patent Document 2] Reference Room in the homepage of Japan Patent Office, www.jpo.go.jp.

As discussed above, a compressed image data including an I picture in which all macroblocks in a frame are intra-coded is not appropriate for a low-delay system since there is a possibility of causing a delay in the processing of the I picture. Then, proposed is a coding method shown in Non-Patent Document 1.

In Non-Patent Document 1, no I picture in which all macroblocks in a frame are intra-coded is used. In Non-Patent Document 1, intra macroblocks are arranged on a slice-by-slice basis. All macroblocks in a slice within a frame are coded as intra macroblocks to be directly subjected to DCT without using any prediction. Such a slice is termed an "intraslice". By shifting a place to which the intraslice is applied on a frame-by-frame basis, the intraslice makes the rounds of the whole screen in a certain cycle and the screen is thereby refreshed. Since the amount of generated codes required for the intraslice is smaller than that required for the I picture, it is possible to reduce the buffer size and decrease the delay.

Also in Non-Patent Document 2, similarly, disclosed is a technique using the intraslice.

As shown in Non-Patent Documents 1 and 2, with the intraslice, it is possible to disperse intrablocks in a GOP (Group of Pictures).

This method, however, in which all the macroblocks in a slice are intra-coded and the position of the intraslice is shifted by one row on a frame-by-frame basis, causes degradation in image quality. Specifically, when images are reproduced in series, the intraslices disadvantageously appear like scan lines.

In the above-discussed Patent Document 1, the intra macroblocks are dispersed on a macroblock-by-macroblock basis. Even in a case using the technique shown in Patent Document 1, since the intra macroblocks are moved at certain intervals, the positions of the intra macroblocks are disadvantageously noticeable.

DISCLOSURE OF INVENTION

The present invention is intended for an image coding apparatus. According to an aspect of the present invention, the image coding apparatus comprises a block count determination part for determining the number of intra macroblocks to be included in each frame, a position determination part for determining respective spatial positions of the intra macroblocks to be included in each frame in the frame, and a coding part for arranging the intra macroblocks, the number of which is determined by the block count determination part, in each frame on the basis of the positions determined by the position determination part, to thereby perform coding. The position determination part arranges the intra macroblocks to be included in each frame at random positions in the frame.

By using the image coding apparatus of the present invention, the intra macroblocks are dispersed in a time direction. This technique is adaptable to a low-delay system. Further, it is possible to reduce the buffer size.

By using the image coding apparatus of the present invention, the intra macroblocks can be arranged at random in a spatial direction. The boundaries of the intra macroblocks thereby become unnoticeable and it is therefore possible to improve the image quality.

According to another aspect of the present invention, the image coding apparatus comprises a position determination part for determining respective spatial positions of intra macroblocks to be included in each frame in the frame; and a coding part for arranging the intra macroblocks in each frame on the basis of the positions determined by the position determination part, to thereby perform coding. The position determination part arranges the intra macroblocks so that there is a difference in the motion of the intra macroblocks in a time direction between even-numbered frames and odd-numbered frames.

Therefore, it is an object of the present invention to provide an image coding technique for suppressing degradation in image quality, in which the time and space where the intra macroblocks appear are dispersed.

These and other objects, features, aspects and advantages of the present invention will become more apparent from the

BEST MODE FOR CARRYING OUT THE INVENTION

Hereinafter, with reference to figures, discussion will be made on image coding apparatuses of the preferred embodiments of the present invention.

The First Preferred Embodiment

<Constitution of Image Coding Apparatus>

Figure 1:
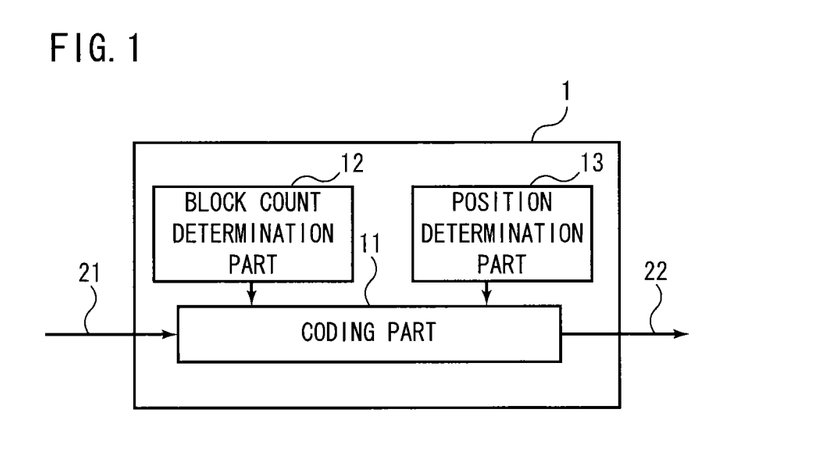
FIG. 1 is a block diagram showing an image coding apparatus.

FIG. 1 is a block diagram showing an image coding apparatus 1 in accordance with a first preferred embodiment. The image coding apparatus 1 comprises a coding part 11, a block count determination part 12, and a position determination part 13.

The coding part 11 receives uncompressed image data 21. The coding part 11 performs an image coding process on the received uncompressed image data 21, to thereby output compressed image data 22. The coding part 11 performs the image coding process using a coding system such as MPEG2, H.264, or the like.

The block count determination part 12 determines the number of intra macroblocks to be allocated to each frame. The image coding apparatus 1 of the first preferred embodiment does not use any I picture in which all macroblocks are intra-coded. The image coding apparatus 1 of the first preferred embodiment arranges the intra macroblocks dispersedly in a time direction. The block count determination part 12 determines allocation of the intra macroblocks in the time direction. The block count determination part 12 arranges the intra macroblocks so that all the macroblocks in a frame may be intra-coded once within a refresh cycle. A group of images in the refresh cycle corresponds to one GOP (Group of Pictures).

The position determination part 13 determines respective positions of the intra macroblocks in a spatial direction in each frame. The position determination part 13 arranges the intra macroblocks in each frame so that all the macroblocks in one frame may be intra-coded once within the refresh cycle.

<Processing of Block Count Determination Part>

Figure 2:
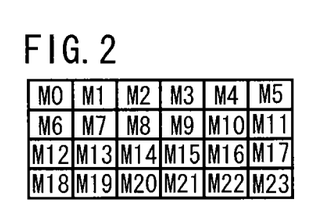
FIG. 2 is a view showing a frame image consisting of macroblocks M0 to M23.

Now, detailed discussion will be made on processing performed in the block count determination part 12. As discussed above, the block count determination part 12 determines the number of intra macroblocks to be allocated to each frame. Herein, as shown in FIG. 2, a case where one frame consists of twenty-four macroblocks M0 to M23 is taken as an example. One frame consists of six macroblocks wide and four macroblocks long. In this case, discussion will be made assuming that the refresh cycle corresponds to ten frames. In other words, during the elapse of ten frames, all the macroblocks M0 to M23 need to be intra-coded once.

The block count determination part 12 allocates timings at which the twenty-four macroblocks are intra-coded so that the timings may be dispersed as evenly as possible in the ten frames. First, the block count determination part 12 divides the number M of macroblocks in one frame by the number N of frames in the refresh cycle, as expressed by the following Eq. 1.

$$M/N = S \ldots R \quad \text{(Eq. 1)}$$

In Eq. 1, S is the quotient of M divided by N and R is the remainder. M, N, S, and R are all positive integers. R is an integer smaller than N. In the exemplary case discussed herein, Eq. 1 can be expressed by the following Eq. 2.

$$24/10 = 2 \ldots 4 \quad \text{(Eq. 2)}$$

By performing the arithmetic operation of Eq. 2, the block count determination part 12 first determines to allocate two intra macroblocks to each of all the frames. The block count determination part 12 further evenly allocates the remaining four intra macroblocks within the refresh cycle.

In general, by performing the arithmetic operation of Eq. 1, the block count determination part 12 first determines to allocate S intra macroblocks to each of all the frames. The block count determination part 12 further evenly allocates the remaining R intra macroblocks within the refresh cycle. When the remainder R is 0, processing is completed by allocating S intra macroblocks to each of all the frames.

Next, the block count determination part 12 divides the number N of frames in the refresh cycle by the remainder R, as expressed by the following Eq. 3.

$$N/R = D \ldots Q \quad \text{(Eq. 3)}$$

In Eq. 3, D is the quotient of N divided by R and Q is the remainder. D is a positive integer. Q is a positive integer smaller than R. In the exemplary case discussed herein, Eq. 3 can be expressed by the following Eq. 4.

$$10/4 = 2 \ldots 2 \quad \text{(Eq. 4)}$$

By performing the arithmetic operation of Eq. 4, the block count determination part 12 determines to dispersedly dispose two of the remaining four intra macroblocks at an interval of two frames and the other two of the remaining four intra macroblocks at an interval of three frames.

In general, by performing the arithmetic operation of Eq. 3, the block count determination part 12 determines to dispersedly dispose (R–Q) of the remaining R intra macroblocks at an interval of D frames and Q of the remaining R intra macroblocks at an interval of (D+1) frames. When the remainder Q is 0, processing is completed by allocating R intra macroblocks at an interval of D frames.

By performing the above arithmetic operations, the block count determination part 12 determines allocation on the basis of the following standard rules.

(Standard Rule 1) When R is 0, S intra macroblocks are allocated to each of all the frames.

(Standard Rule 2) When R is not 0 and Q is 0, S intra macroblocks are allocated to each of all the frames and each of R intra macroblocks is further dispersedly disposed at an interval of D frames. Specifically, S intra macroblocks are disposed in (N−R) frames and (S+1) intra macroblocks are disposed in dispersed R frames.

(Standard Rule 3) When R is not 0 and Q is not 0, S intra macroblocks are first allocated to each of all the frames. Further, (R−Q) of the remaining R intra macroblocks are dispersedly disposed at an interval of D frames and Q of the remaining R intra macroblocks are dispersedly disposed at an interval of (D+1) frames. Specifically, when R is not 0 and Q is not 0, the block count determination part 12 allocates (S+1) intra macroblocks to each of (R−Q) frames which are disposed at an interval of D frames and Q frames which are disposed at an interval of (D+1) frames and allocates S intra macroblocks to each of the remaining (N−R) frames.

Thus, in the first preferred embodiment, the block count determination part 12 arranges the macroblocks dispersedly in the time direction, and since S or (S+1) intra macroblocks are disposed in each of the frames, the difference in the number of intra macroblocks to be allocated to each frame among all the frames is at most one. Further, since the frames each including (S+1) intra macroblocks are disposed at an interval of D frames or (D+1) frames, the difference in the frame interval is at most one.

Figure 3:
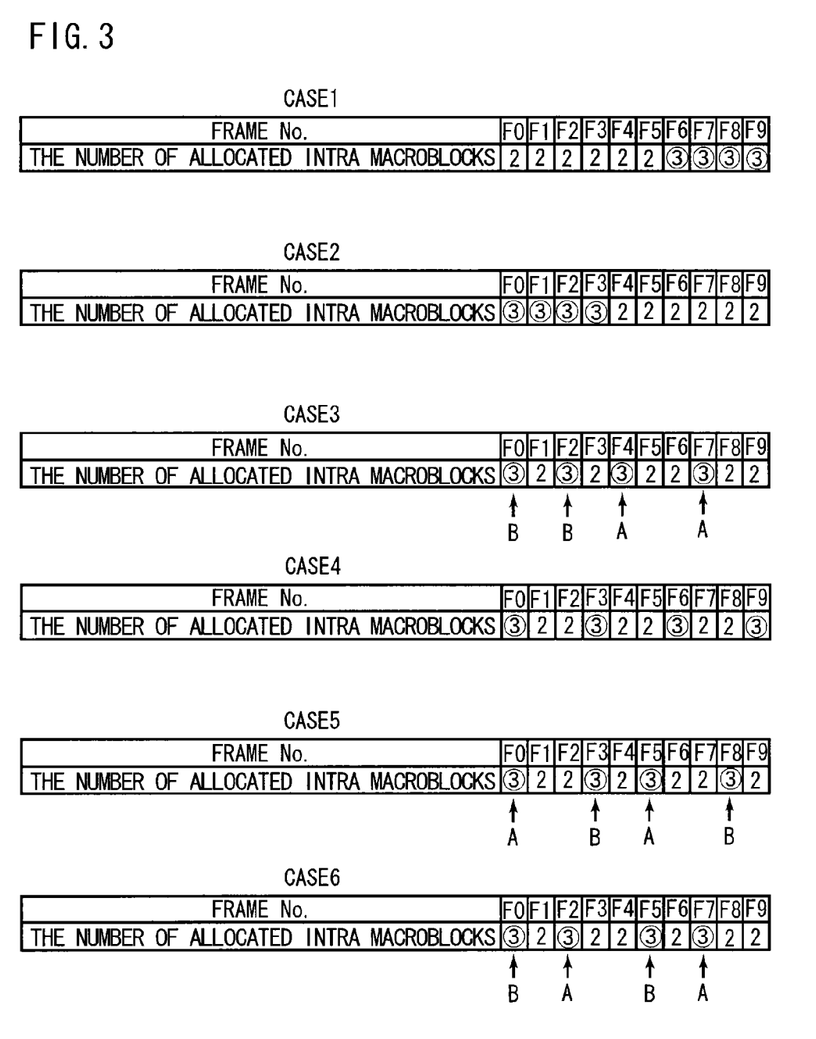
FIG. 3 is a view showing patterns for the number of macroblocks to be allocated in a time direction.

FIG. 3 shows arrangement patterns of the intra macroblocks. FIG. 3 shows the number of intra macroblocks allocated to each of ten frames F0 to F9. In FIG. 3, Cases 1, 2, and 4 do not conform to the above Standard Rule 3. As discussed above, the frames each including (S+1) intra macroblocks are disposed at an interval of D frames or (D+1) frames and the difference in the frame interval is at most one. Cases 1 and 2 largely fall outside this condition. In Case 4, from FIG. 3, the frames each including three intra macroblocks appears to be evenly disposed. Since the frame F0 follows the frame F9, however, the frames each including three intra macroblocks consecutively appear and therefore Case 4 does not conform to this condition for the same reason as that for Cases 1 and 2.

Cases 3, 5, and 6 satisfies the above Standard Rule 3. In Case 3, however, the frames each including three intra macroblocks are concentrated in the frames F0 to F4. The block count determination part 12 determines Cases 5 and 6 as allocation patterns of the intra macroblocks in accordance with the following algorithm.

As discussed above, the frames each including (S+1) intra macroblocks include those which are disposed at an interval of D frames and those which are disposed at an interval of (D+1) frames. The block count determination part 12 dispersedly disposes the frames each including (S+1) intra macroblocks so that the (D+1) frame interval may be disposed as evenly as possible in the time direction. It is assumed herein that each of those which are disposed at an interval of (D+1) frames among the frames each including (S+1) intra macroblocks is referred to as a "frame A" and each of those which are disposed at an interval of D frames is referred to as a "frame B". In FIG. 3, the frame A and the frame B are indicated distinguishably in Cases 3, 5, and 6. The block count determination part 12 disposes the frames A so that the dispersion in the distance between one frame A and another frame A may be as small as possible. In accordance with this algorithm, Case 3 in which variation in the distance between the frames A is large is excluded. Any one of Cases 5 and 6 may be selected. The block count determination part 12 can take, for example, a rule that the D frame interval is first disposed. In this case, Case 6 is selected.

<Processing of Position Determination Part>

Figure 4:
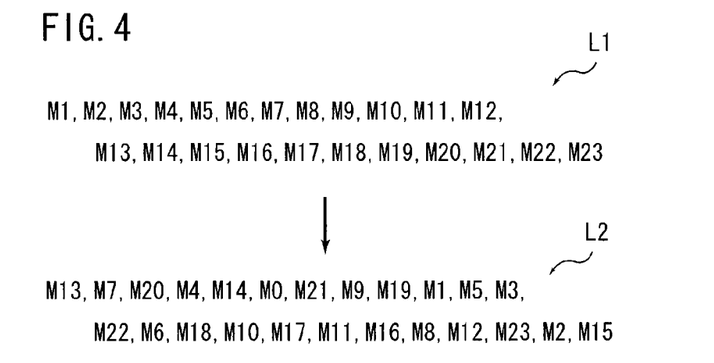
FIG. 4 is a view showing a number row L1 for macroblocks and a number row L2 for shuffled macroblocks.

Next, discussion will be made on processing performed in the position determination part 13. As discussed above, the position determination part 13 determines respective positions of intra macroblocks in a frame in the spatial direction. The position determination part 13 first shuffles a row of macroblock numbers by using random numbers, to thereby generate a new row of macroblock numbers. As shown in FIG. 2, the macroblocks are given numbers from M0 to M23 from the upper left of a frame toward the lower right. The position determination part 13 shuffles a number row L1 for the macroblocks, in which the numbers are arranged in order from M0 to M23, by using the random numbers and generates such a new number row L2 for the macroblocks as shown in FIG. 4.

Figure 5:
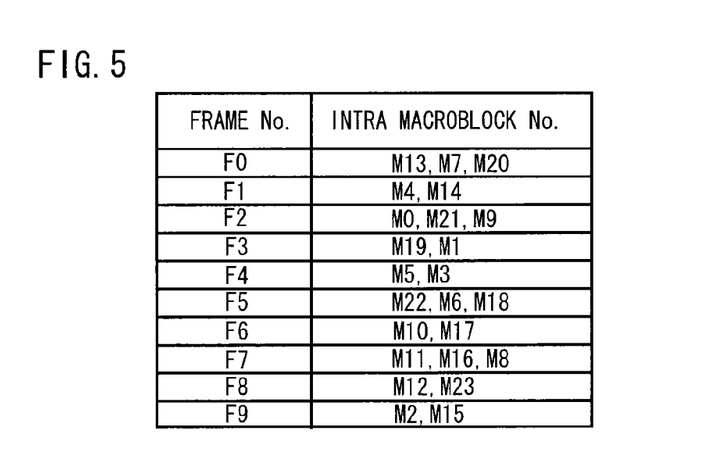
FIG. 5 is a view showing block numbers of macroblocks to be intra-coded in each of frames.

The position determination part 13 next determines the macroblocks to be intra-coded in each frame in accordance with the number of intra macroblocks in each frame which is determined by the block count determination part 12, as shown in FIG. 5.

In the above-discussed exemplary case, the block count determination part 12 selects Case 6 in FIG. 3. Specifically, the respective numbers of intra macroblocks in the frames numbered in order of F0, F1, F2 . . . , F9 are determined to be 3, 2, 3, 2, 2, 3, 2, 3, 2, and 2. The position determination part 13 determines the first three macroblocks in the number row L2 as the macroblocks to be intra-coded in the frame F0. Subsequently, the position determination part 13 determines the 4-th and 5-th macroblocks in the number row L2 as the macroblocks to be intra-coded in the frame F1. Further subsequently, the position determination part 13 determines the 6-th to 8-th macroblocks in the number row L2 as the macroblocks to be intra-coded in the frame F2. Thus, the respective positions of the macroblocks to be intra-coded in each of all the frames are determined.

Figure 6:
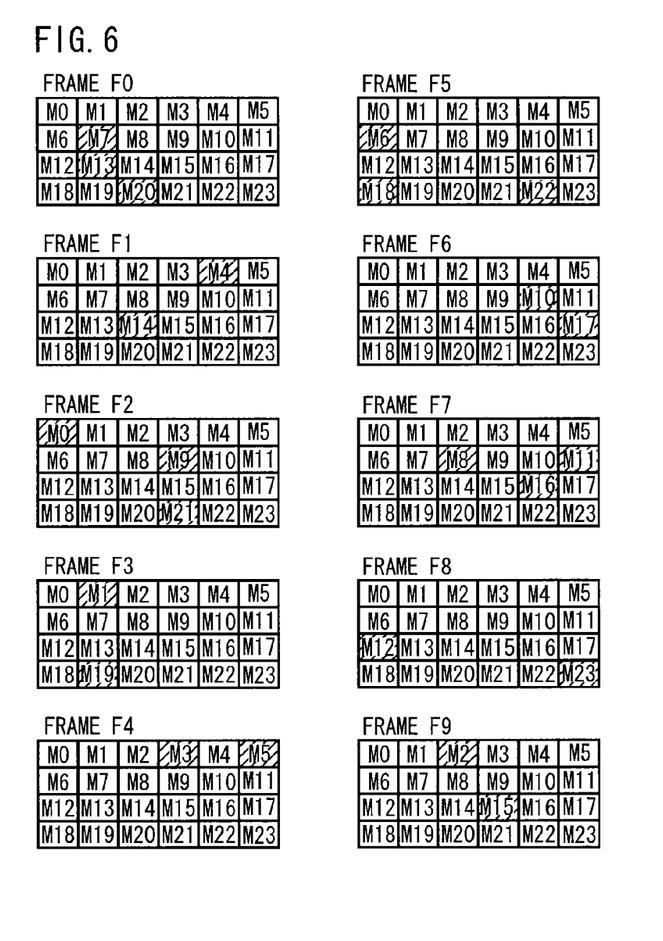
FIG. 6 is a view showing a spatial arrangement of the intra macroblocks in each of the frames.

FIG. 6 shows the respective positions of the macroblocks to be intra-coded in each of all the frames. In FIG. 6, the hatched macroblocks are macroblocks to be intra-coded. It can be seen that the intra macroblocks are irregularly arranged in each frame. It can be also seen that the number of intra macroblocks are arranged in a balanced manner in the time direction.

Figure 7:
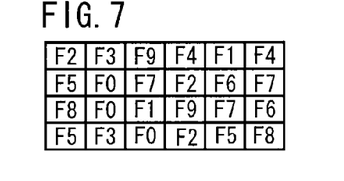
FIG. 7 is a view showing a frame number of the frame in which each macroblock is to be intra-coded.

FIG. 7 is a view showing in which frame each macroblock in a frame is to be intra-coded. The matrix of FIG. 7 corresponds to that of FIG. 2. Specifically, it is found that the macroblock M0 in FIG. 2 is to be intra-coded in the frame F2 as shown in FIG. 7. It is also found that the macroblock M8 in FIG. 2 is to be intra-coded in the frame F7 as shown in FIG. 7.

<Coding Process>

Referring back to FIG. 1, the coding part 11 codes the uncompressed image data 21 on the basis of the allocation of the macroblocks in the time direction, which is determined by the block count determination part 12, and the arrangement of the macroblocks in the spatial direction, which is determined by the position determination part 13. The coding part 11 outputs the compressed image data 22 after coding.

In the compressed image data 22 generated by the image coding apparatus 1 of the first preferred embodiment, as discussed above, the intra macroblocks are randomly arranged in each frame. Since there is no regularity in the arrangement of the intra macroblocks in the spatial direction, the boundary between the intra macroblocks and the inter macroblocks become unnoticeable. This avoids the degradation in image quality due to clear difference in image quality, unlike the case using the intraslice. Further, it is possible to solve the problem that the spatial positions of the intra macroblocks are regularly moved and this causes the intra macroblocks to be noticeable.

Furthermore, in the compressed image data 22 generated by the image coding apparatus 1 of the first preferred embodiment, the number of macroblocks are evenly allocated in the refresh cycle. Therefore, the amount of codes is evenly dispersed. Unlike the case using the I pictures, the amount of codes does not oscillate. This reduces the buffer size and the image data can be used in a low-delay system.

Figure 8:
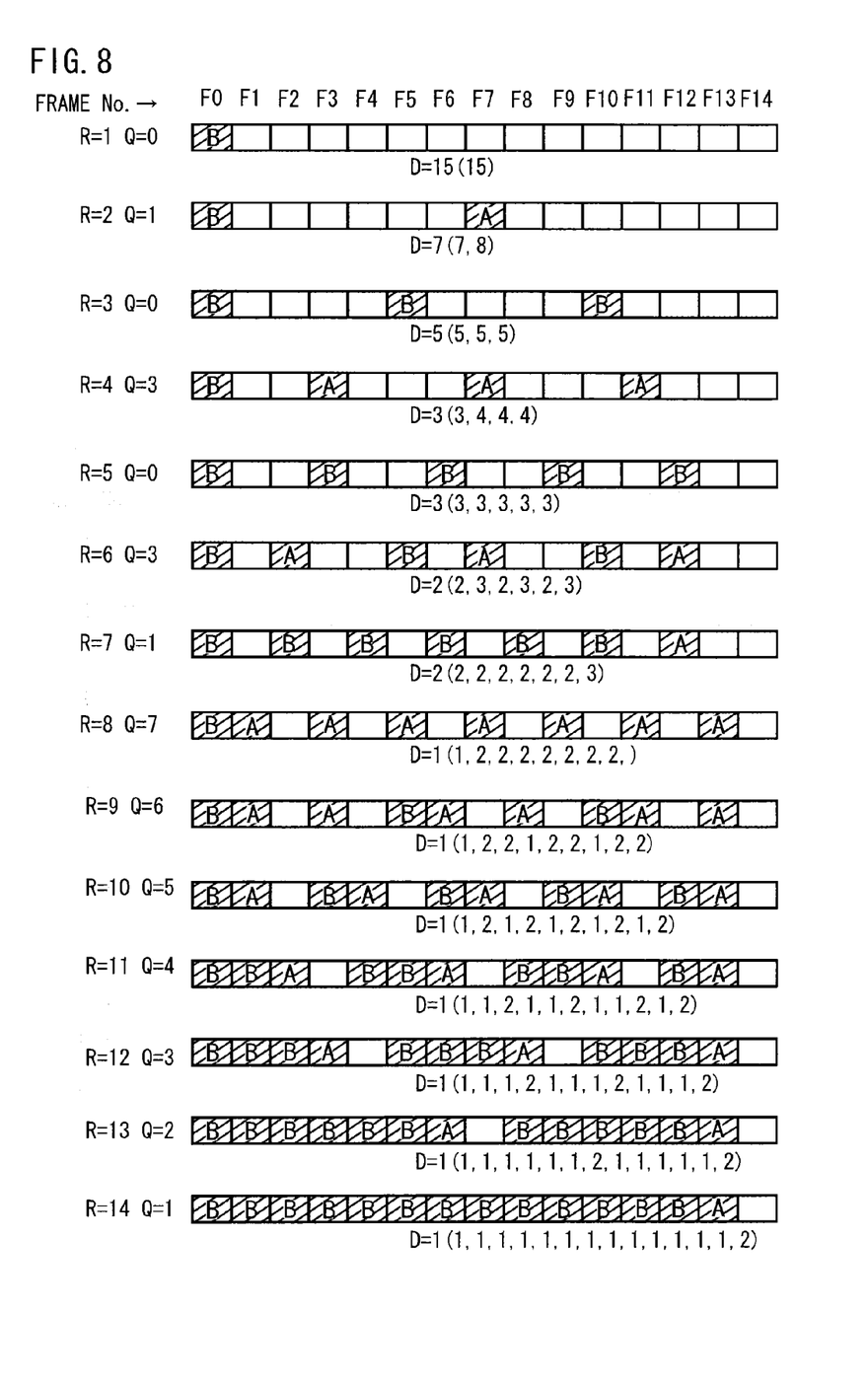
FIG. 8 is a view showing the number of allocated macroblocks to be intra-coded in each of the frames.
Figure 9A:
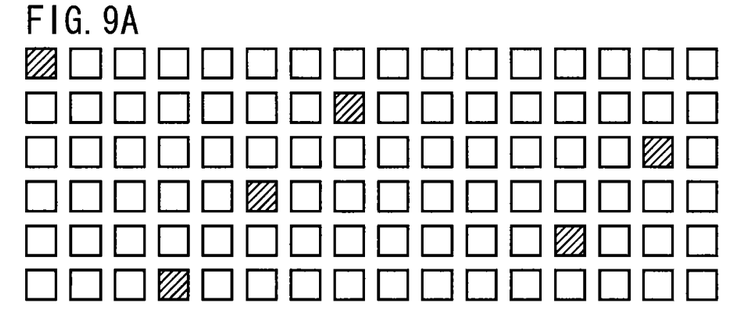
FIG. 9A is a view showing an exemplary arrangement of intra macroblocks, which is achieved by using a function.
Figure 9B:
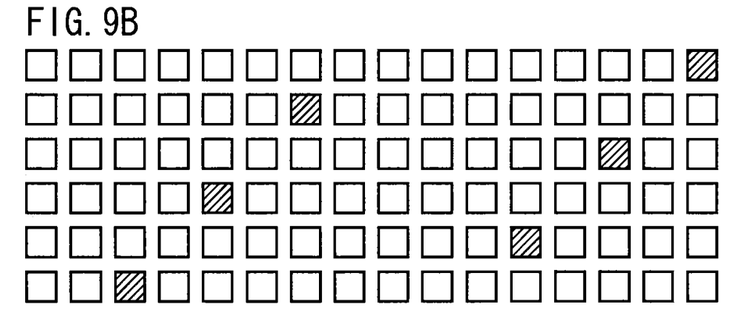
FIG. 9B is a view showing another exemplary arrangement of intra macroblocks, which is achieved by using a function.
Figure 9C:
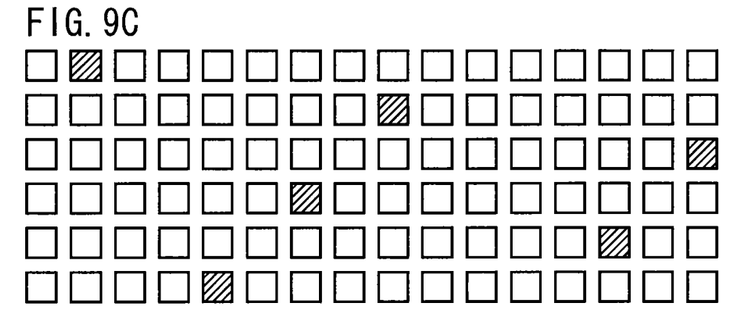
FIG. 9C is a view showing still another exemplary arrangement of intra macroblocks, which is achieved by using a function.
Figure 9D:
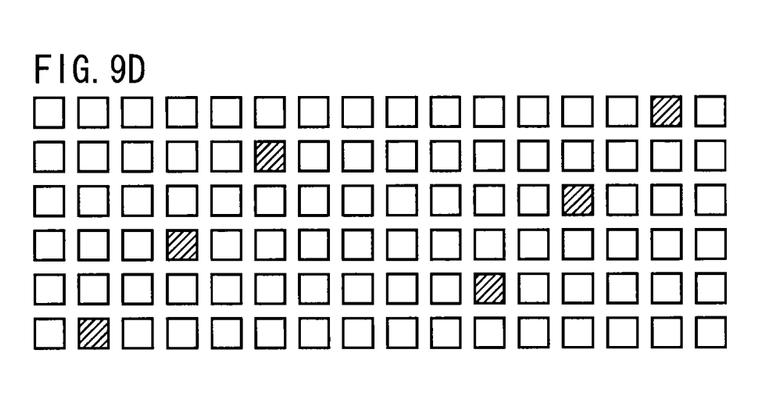
FIG. 9D is a view showing yet another exemplary arrangement of intra macroblocks, which is achieved by using a function.
Figure 9E:
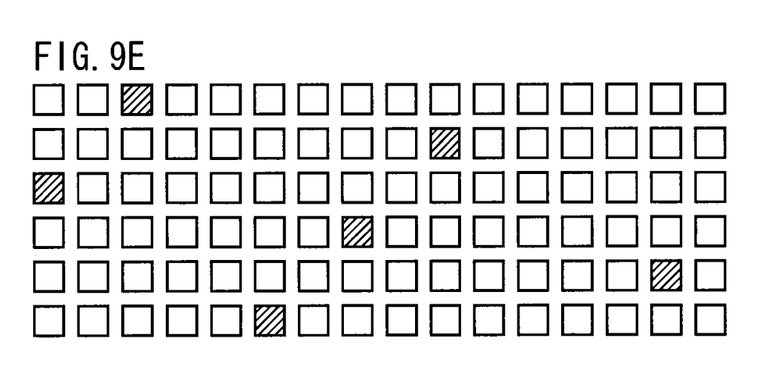
FIG. 9E is a view showing a further exemplary arrangement of intra macroblocks, which is achieved by using a function.

In the above discussion, the case where the refresh cycle is ten frames is taken as an example. FIG. 8 shows a case where the refresh cycle is fifteen frames, i.e., N=15. In FIG. 8, a blank frame represents the frame including S intra macroblocks and a hatched frame represents the frame including (S+1) intra macroblocks. When R takes a number from 1 to 14, how the frames each including (S+1) intra macroblocks are arranged are shown in this figure.

It can be seen from FIG. 8 that the frames each including (S+1) intra macroblocks are evenly disposed. Some of the hatched frames, which are given the sign "A", are the above-described frames A and the other hatched frames which are given the sign "B" are the above-described frames B. It can be seen that the hatched frames are evenly disposed and the frames A are also evenly disposed.

<Variations>

In the first preferred embodiment, Case 5 or 6 is selected out of Cases 1 to 6 shown in FIG. 3. This is a selection according to the purpose that the intra macroblocks are disposed in the spatial direction as evenly as possible and the amount of generated codes is made uniform.

This variation uses a method in which the intra macroblocks which are important for image quality are disposed in the first half of the refresh cycle wherever possible. This selection method is effective in a case where the code amount control is performed in a unit of GOP. In the case where the code amount control is performed in a unit of GOP, by disposing the intra macroblocks which are important for image quality in the first half of the refresh cycle wherever possible, it is possible to solve a problem that a certain amount of bits to be allocated to the intra macroblocks in the second half of the refresh cycle run short. This is because lack of bits to be allocated to the intra macroblocks causes the degradation in image quality.

In the case where this variation is adopted, the block count determination part 12 selects Case 2. Alternatively, the block count determination part 12 may select Case 3 on the basis of overall determination of the above Standard Rule 3 and the idea that the intra macroblocks should be disposed in the first half wherever possible.

Further, in the first preferred embodiment, after selecting Cases 5 and 6, Case 6 is finally selected. This selection conforms to the idea of this variation that the intra macroblocks should be disposed in the first half wherever possible.

The Second Preferred Embodiment

In a second preferred embodiment, the arrangement of the intra macroblocks is determined by using a function. It is assumed herein that the current frame number is Y1 and the number of macroblocks in a line direction is Y2. As expressed by Eq. 5, it is assumed that the quotient of Y1 divided by Y2 is Y3 and the remainder is Y4.

$$Y1/Y2=Y3 \ldots Y4 \quad \text{(Eq. 5)}$$

When Y4 is an even number, as expressed by Eq. 6, the half of Y4 is determined to be Y5.

$$Y5=Y4/2 \quad \text{(Eq. 6)}$$

When Y4 is an odd number, Y5 is determined as expressed by Eq. 7, where a fractional portion of Y4/2 is rounded down.

$$Y5=(Y2-1)-Y4/2 \quad \text{(Eq. 7)}$$

Next, as expressed by Eq. 8, n-times (n is a constant) of a y coordinate mb_y (=0, 1, 2 . . . ) of a macroblock to be processed is added to Y5, and it is assumed that the quotient of a value obtained by the addition divided by Y2 is Y6 and the remainder is Y7, where n is a positive integer.

$$(Y5+n\times mb\_y)/Y2=Y6 \ldots Y7 \quad \text{(Eq. 8)}$$

After performing the above arithmetic operations, when an x coordinate mb_x (=0, 1, 2 . . . ) of the macroblock to be processed coincides with Y7, the macroblock to be processed is determined to be an intra macroblock.

In the second preferred embodiment, by using a function, it can be determined whether to intra-code each macroblock. Since the intra macroblocks are dispersedly disposed in a frame, no degradation in image quality is caused.

The image coding apparatus 1 of the second preferred embodiment comprises no block count determination part 12 shown in FIG. 1. The position determination part 13 determines the frames in which the intra macroblocks are to be allocated and the position of each of the intra macroblocks in the frame.

FIGS. 9A to 9E are views showing the intra macroblocks arranged in accordance with the second preferred embodiment. FIGS. 9A to 9E show frames with Nos. 0 to 4, respectively. In the figures, the hatched macroblocks represent intra macroblocks. In the second preferred embodiment, the positions of the intra macroblocks are not random but determined by using the above-discussed function.

In the second preferred embodiment, it is possible to differentiate the moving directions of the intra macroblocks between the even-numbered frames and the odd-numbered frames. When the intra macroblocks in all the frames perform the same motion in the time direction, the intra macroblocks become noticeable and this causes degradation in image quality. In accordance with the second preferred embodiment, it is possible to give irregularity to the motions of the intra macroblocks and therefore improve the image quality.

While the invention has been shown and described in detail, the foregoing description is in all aspects illustrative and not restrictive. It is therefore understood that numerous modifications and variations can be devised without departing from the scope of the invention.

The invention claimed is:

1. An image coding apparatus, comprising:
   block count determination circuitry configured to determine the number of intra macroblocks to be included in an individual frame;
   position determination circuitry configured to determine spatial positions of the intra macroblocks in the individual frame so that the intra macroblocks are to be arranged at random spatial positions in the individual frame; and
   coding circuitry configured to
      input uncompressed image data,
      arrange the intra macroblocks, the number of which is determined by the block count determination circuitry, in the individual frame on the basis of the positions determined by the position determination circuitry, and
      perform coding using the uncompressed image data,
   wherein:
   one frame consists of M macroblocks and each of the macroblocks is intra-coded once in N frames,
   the block count determination circuitry is configured to allocate S intra macroblocks to each frame when M is an integral multiple of N and it is assumed that the quotient of M divided by N is S, and
   the block count determination circuitry is configured to allocate S intra macroblocks to each of (N−R) frames and allocates (S+1) intra macroblocks to each of R frames when M is not an integral multiple of N and it is assumed that M divided by N gives S as a quotient, leaving R as a remainder.

2. The image coding apparatus according to claim 1, wherein:
   the block count determination circuitry disposes the frames each including (S+1) intra macroblocks at a rate of one in D frames when N is an integral multiple of R and it is assumed that the quotient of N divided by R is D, and
   the block count determination circuitry disposes (R−Q) frames each including (S+1) intra macroblocks at an interval of D frames and disposes Q frames each including (S+1) intra macroblocks at an interval of (D+1) frames when N is not an integral multiple of R and it is assumed that N divided by R gives D as a quotient, leaving Q as a remainder.

3. The image coding apparatus according to claim 2, wherein the block count determination circuitry mixedly arranges frames A which are disposed at an interval of (D+1) frames and frames B which are disposed at an interval of D frames among R frames each including (S+1) intra macroblocks so that dispersion of frame interval of the frames A becomes as small as possible.

4. The image coding apparatus according to claim 1, wherein the block count determination circuitry arranges the intra macroblocks so that the ratio of the intra macroblocks is higher in the first half of a Group of Pictures (GOP).

* * * * *